US008183818B2

(12) United States Patent
Elhalis

(10) Patent No.: US 8,183,818 B2
(45) Date of Patent: May 22, 2012

(54) SWITCHING TIME CONTROL MULTIPLEXER SYSTEM

(76) Inventor: Hesham A. Elhalis, Clinton Township, MI (US)

( * ) Notice: Subject to any disclaimer, the term of this patent is extended or adjusted under 35 U.S.C. 154(b) by 501 days.

(21) Appl. No.: 12/399,692

(22) Filed: Mar. 6, 2009

(65) Prior Publication Data
US 2010/0225267 A1 Sep. 9, 2010

(51) Int. Cl.
*H02J 7/00* (2006.01)
*H02J 7/04* (2006.01)

(52) U.S. Cl. ...... 320/101; 320/117; 320/121; 320/126; 320/134; 320/138; 320/155; 320/162; 136/291; 323/906

(58) Field of Classification Search ........ 320/101, 320/126, 133, 134, 138, 155, 162, 117, 121; 136/291; 323/906
See application file for complete search history.

(56) References Cited

U.S. PATENT DOCUMENTS

| | | | |
|---|---|---|---|
| 3,963,976 A | 6/1976 | Clark | |
| 4,770,954 A | 9/1988 | Noordenbos | |
| 5,496,654 A | 3/1996 | Perkins | |
| 5,656,920 A | 8/1997 | Cherng et al. | |
| 5,734,253 A | 3/1998 | Brake et al. | |
| 5,939,855 A * | 8/1999 | Proctor et al. | 320/104 |
| 6,075,343 A * | 6/2000 | Hsu | 320/134 |
| 6,127,621 A * | 10/2000 | Simburger | 136/246 |
| 6,154,011 A | 11/2000 | Lam et al. | |
| 6,511,764 B1 * | 1/2003 | Marten | 429/7 |
| 6,781,343 B1 * | 8/2004 | Demachi et al. | 320/101 |
| 7,414,332 B2 * | 8/2008 | Ohsuga | 307/80 |
| 7,425,815 B2 | 9/2008 | Wong et al. | |
| 7,489,110 B2 * | 2/2009 | Stanesti et al. | 320/135 |
| 2005/0050234 A1 * | 3/2005 | Choi | 710/2 |
| 2008/0036425 A1 * | 2/2008 | Tashiro et al. | 320/154 |
| 2008/0224541 A1 * | 9/2008 | Fukuhara | 307/48 |
| 2009/0015191 A1 * | 1/2009 | Benckenstein, Jr. et al. | 320/102 |

OTHER PUBLICATIONS

Keyser, M. et al., 2001 R&D 100 Award Recipient, "Charging Algorithm Extends the Life of Lead-acid Batteries," http://www.nrel.gov/vehiclesandfuels/energystorage/pdfs/rd100_winner.pdf, 1 pg.
Sutula, R. et al., "Current Interrupt Charging Algorithm," http://www.afdc.energy.gov/afdc/pdfs/inter_charging.pdf, United States of America Department of Energy, Mar. 2002, 1 pg.
Hsieh, Y. et al., "A Multi-Mode Charging Circuit for Rechargeable Batteries," The 2005 International Power Electronics Conference, pp. 1569-1574.
Wilkinson, J.J.A. et al., "A New Pulse Charging Methodology for Lead Acid Batteries," IPENZ Transactions, v. 25, n. 1/EMCh, 1998, pp. 1-16.
"Pulse Formation Characteristics and Benefits for Lead-Acid Batteries," Powerpoint Presentation: 11 ELBC, Applied Electronic Labs, pp. 1-18.

(Continued)

*Primary Examiner* — Patrick Assouad
*Assistant Examiner* — Steve T Chung
(74) *Attorney, Agent, or Firm* — Brooks Kushman P.C.

(57) ABSTRACT

A system for energizing an energy storage device includes an electric power source, an energy system in communication with the electric power source, and a switching time control multiplexer. The energy storage system includes at least two parallel energy storage devices. The switching time control multiplexer is configured to supply total charging current from the electric power source to the energy storage system such that each storage device is charged in an alternating manner with the total charging current being less than a total charging current required for parallel charging.

19 Claims, 9 Drawing Sheets

OTHER PUBLICATIONS

"High Current Battery Formation and Charging Equipment," Powerpoint presentation: LABAT 2008 Applied Electronics Labs, pp. 1-18.

C&D Technologies, Inc., "Charging Dynasty Valve Regulated Lead Acid Batteries," pp. 1-31.

Keyser, M. et al., Powerpoint Presentation: "Charging Algorithms for Increasing Lead Acid Battery Cycle Life for Electric Vehicles," Presented at the 17th Electric Vehicle Symposium, Montreal, Canada, Oct. 16-18, 2000, 28 pgs.

Keyser, M. et al., "Charging Algorithms for Increasing Lead Acid Battery Cycle Life for Electric Vehicles," presented at the 17th Electric Vehicle Symposium, Montreal, Canada, Oct. 16-18, 2000, 17 pgs.

Srinivasan, V. et al., "Mathematical Modeling of Current-Interrupt and Pulse Operation of Valve-Regulated Lead Acid Cells," J. of Electrochemical Soc., 150 (3) A316-A325 (2003), 10 pgs.

"Methods of Charging the Valve-Regulated Lead-Acid Battery," Panasonic, VRLA Batteries, Aug. 2005, 5 pgs.

Usher, E.P. et al., "Recommended Practices for Charge Controllers," IEA PVPS T3-05:1998, includes cover pg., Title pg., pp. ii-iii, v, and pp. 1-60.

C&D Technologies, Inc., "Charger Output AC Ripple Voltage and the Affect on VRLA Batteries," pp. 1-10.

Applied Electronic Labs, "Reviving the Pulse of Formation," pp. 1-8.

\* cited by examiner

SWITCHING TIME CONTROL MULTIPLEXER SYSTEM

TECHNICAL FIELD

The present invention relates to systems and methods for energizing an energy storage device.

BACKGROUND

The high cost of energy and the desire for renewable energy sources provides impetus for the improvement of energy storage systems and, in particular, energy storage systems that use rechargeable batteries.

In a typical rechargeable storage system, a DC power source is used to simultaneously charge batteries and to provide current to a DC load. Typically, the DC power source is selected to provide the maximum current demands that the batteries and load may place on the system resulting in the utilization of somewhat oversized power sources in some applications.

Accordingly, there is a need for improved energy systems with smaller DC power sources.

SUMMARY OF EXEMPLARY EMBODIMENTS OF THE INVENTION

The present invention solves one or more problems of the prior art by providing in at least one embodiment a system for energizing an energy storage device. The system of this embodiment includes an electric power source, an energy system in communication with the electric power source, and a switching time control multiplexer. Characteristically, the energy storage system includes at least two parallel energy storage devices. The switching time control multiplexer is configured to supply total charging current received from the electric power source to the energy storage system such that each storage device is charged in an alternating manner for a predetermined time and frequency with the total charging current being less than a total charging current required for parallel charging in a prior art system. Advantageously, embodiments of the invention improve battery performance by improving charging time, and efficiency, and increasing lifetime. In many applications, the charging time is reduced and the capacity of exhausted or cycled cells recovered. Moreover, the systems of one or more embodiments of the invention limits gassing and temperature rise inside batteries during charging. Advantageously, the time control multiplexer allows high charging current to be interrupted with rest periods to minimize heating, gassing and maximize recharge efficiency. Advantageously, the present embodiment protects batteries from deep discharge.

In another embodiment, a system for energizing an energy storage device having two or more rechargeable batteries is provided. The system of this embodiment includes an electric power source, an energy system in communication with the electric power source, and a switching time control multiplexer. Characteristically, the energy storage system includes at least two parallel batteries. The switching time control multiplexer is configured to supply total charging current received from the electric power source to the batteries such that each battery is charged in an alternating manner for a predetermined time and frequency with the total charging current being less than a total charging current required for parallel charging in a prior art system.

In still another embodiment, a method for having an energy storage system having at least two parallel energy storage devices is provided. The method of this embodiment advantageously utilizes the systems set forth above. The method of this embodiment comprises a step of providing a total charging to the energy storage system in which each storage device is charged in an alternating manner, the total charging current being less than a total charging current required for parallel charging in a prior art system.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Reference will now be made in detail to presently preferred compositions, embodiments and methods of the present invention, which constitute the best modes of practicing the invention presently known to the inventor. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1A:
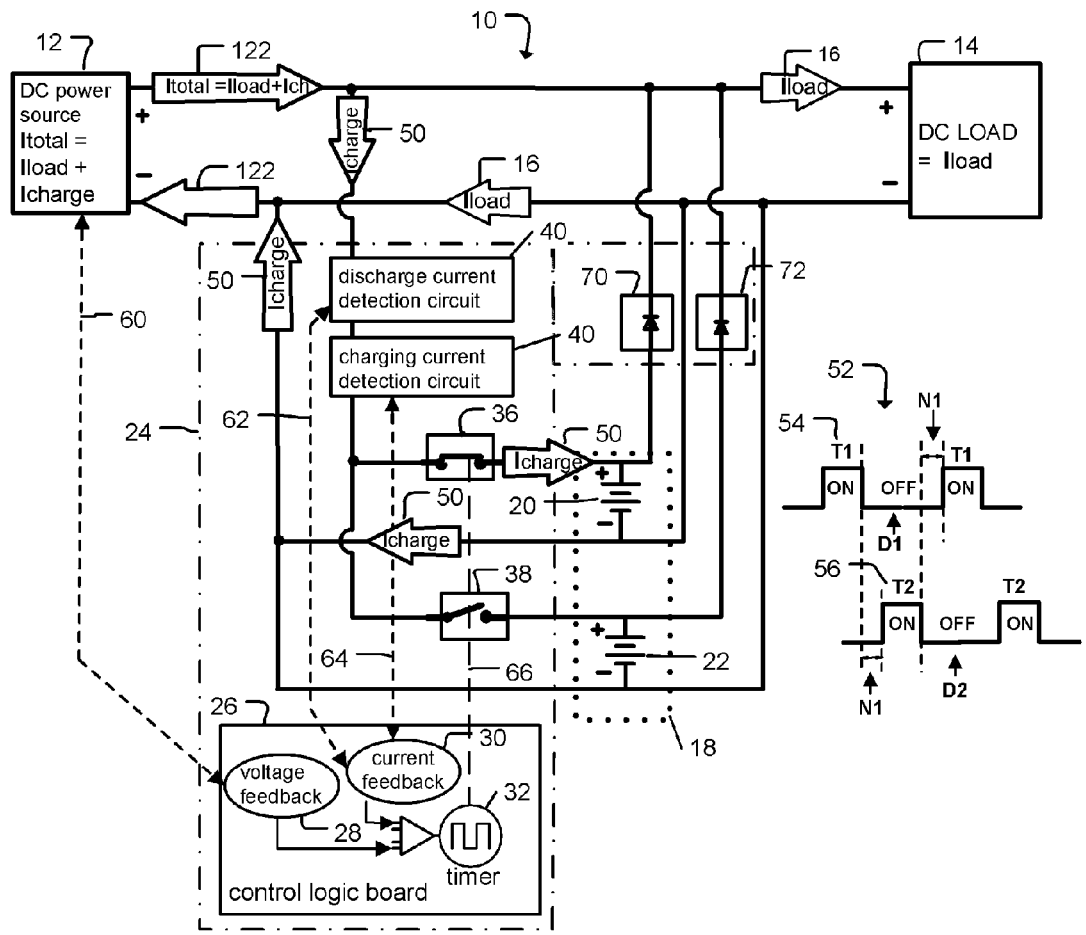
FIG. 1A is a schematic illustration of a system for energizing a storage system charging a first energy storage device in an energy storage system having two parallel energy storage devices.
Figure 1B:
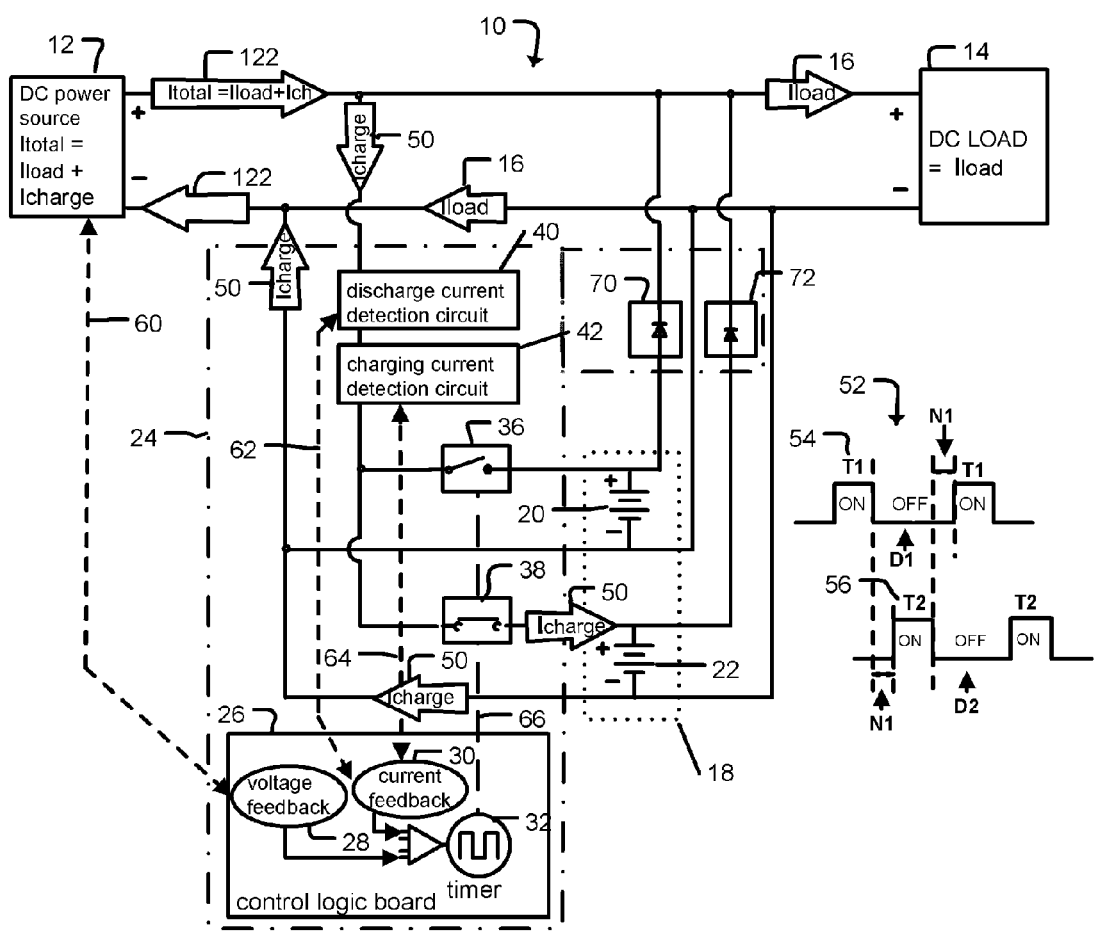
FIG. 1B is a schematic illustration of a system for energizing a storage system charging a second energy storage device in an energy storage system having two parallel energy storage devices.
Figure 1C:
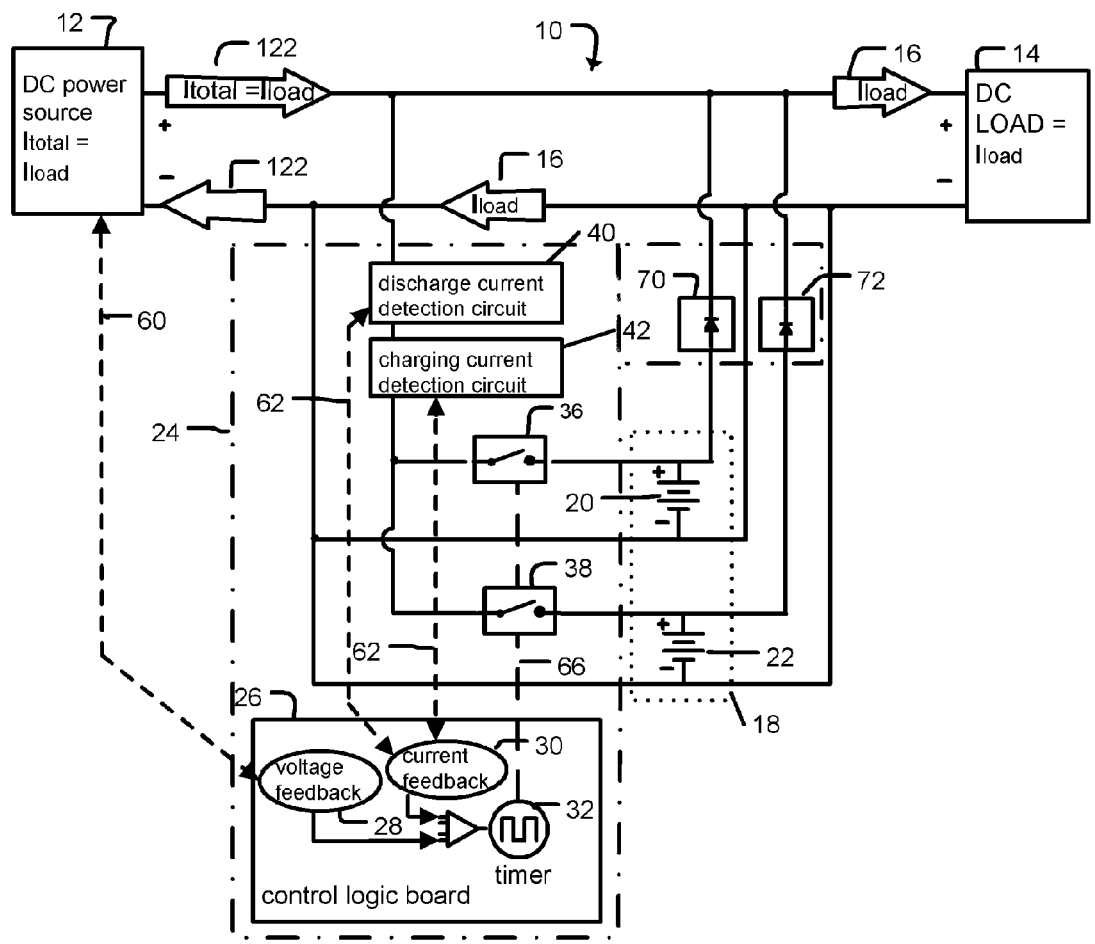
FIG. 1C is a schematic illustration of a system for energizing a storage system in sleeping mode during which the charging current and voltage are ceased for a predetermined time.

With reference to FIGS. 1A, 1B, and 1C, schematic illustrations of a system for energizing an energy storage device is provided. Charging system 10 includes power source 12 in communication with DC load 14. The present embodiment may be used with virtually any electric power source including both AC and DC electric power sources. Examples of electric power sources that may be used include, but are not limited to, photovoltaic (PV)/solar cells, AC/DC power supplies, chargers, rectifier charging sources, or wind electric generators. Current 16 represents the load that DC load 14 places on power source 12. System 10 also includes energy storage system 18, which has energy storage devices 20, 22, which are in communication with and charged by source 12. Examples of energy storage devices that may be energized (i.e., charged) by system 10 include, but are not limited to, rechargeable batteries, capacitors, super capacitors, superconducting magnetic energy storage devices, or flywheels. System 10 also includes switching time control multiplexer 24.

Switching time control multiplexer 24 includes control logic board 26. Control logic board 26, includes voltage feedback circuit 28, current feedback circuit 30, and time controller 32. Switching time control multiplexer 24 also includes switches 36, 38. Switches 36, 38 can be either electronic switches or non-electric switches. Examples of electronic switches include, but are not limited to, solid state relays, transistors, thyristors, and the like. Examples of non-electronic switches include, but are not limited to, relays, contactors, and the like. Switching time control multiplexer 24 also includes discharge current detection circuit 40 and charge current detection circuit 42.

Energy storage devices 20, 22 are energized by power source 12 via charging current 50. Charging current 50 is supplied to each of energy storage devices 20 and 22 in an alternating manner characterized by the timing sequences exemplified by inset 52 which shows that storage device 20 is charged in accordance with timing sequence 54 and storage device 22 is charged in accordance with timing sequence 56 which is characterized by a predetermined frequency ranging from $0.5$–$3 \times 10^{-4}$ Hz. Charging of energy storage device 20 is on for a predetermined period of time T1 ranging from 1-1800 seconds and off for a predetermined period of time D1 ranging from 1-1800 seconds. Similarly, charging of energy storage device 20 is on for a predetermined period of time T2 ranging from 1-1800 seconds and off for a predetermined period of time D2 ranging from 1-1800 seconds. FIG. 1A provides an illustration of the charging of storage device 20 during time T1 while FIG. 1B provides an illustration of the energy storage device 22 during time T2. In a variation of the present embodiment, there is a period of time N1 during which neither storage device is being charged. Typically, the values for T1, T2, D1, D2, and N1 will be dependent on the specifications for energy storage devices 20, 22 and will be set to provide optimal performance and lifetime of the devices. The alternating charging of energy storage devices 20, 22 is established via switches 36, 38 which are controlled by timer 32. FIG. 1C is a schematic illustration of a system for energizing a storage system in sleeping mode in which the charging current and voltage are ceased when the energy storage devices 20, 22 reach a predetermined amount of energy i.e. 100% SOC. During sleeping mode, switches 36 and 38 are both open so that energy storage system 18 is not being charged for a predetermined time ranging from 36-168 hours.

During operation, discharge current detection circuit 40 and charge current detection circuit 42 each independently send a feedback signal 62, 64 to feedback circuit 30. Voltage feedback signal 60 is supplied from the power source 12.

In a variation of the present embodiment, system 10 includes diodes 70, 72, which are used to independently discharge each of energy storage devices 20, 22.

Figure 2:
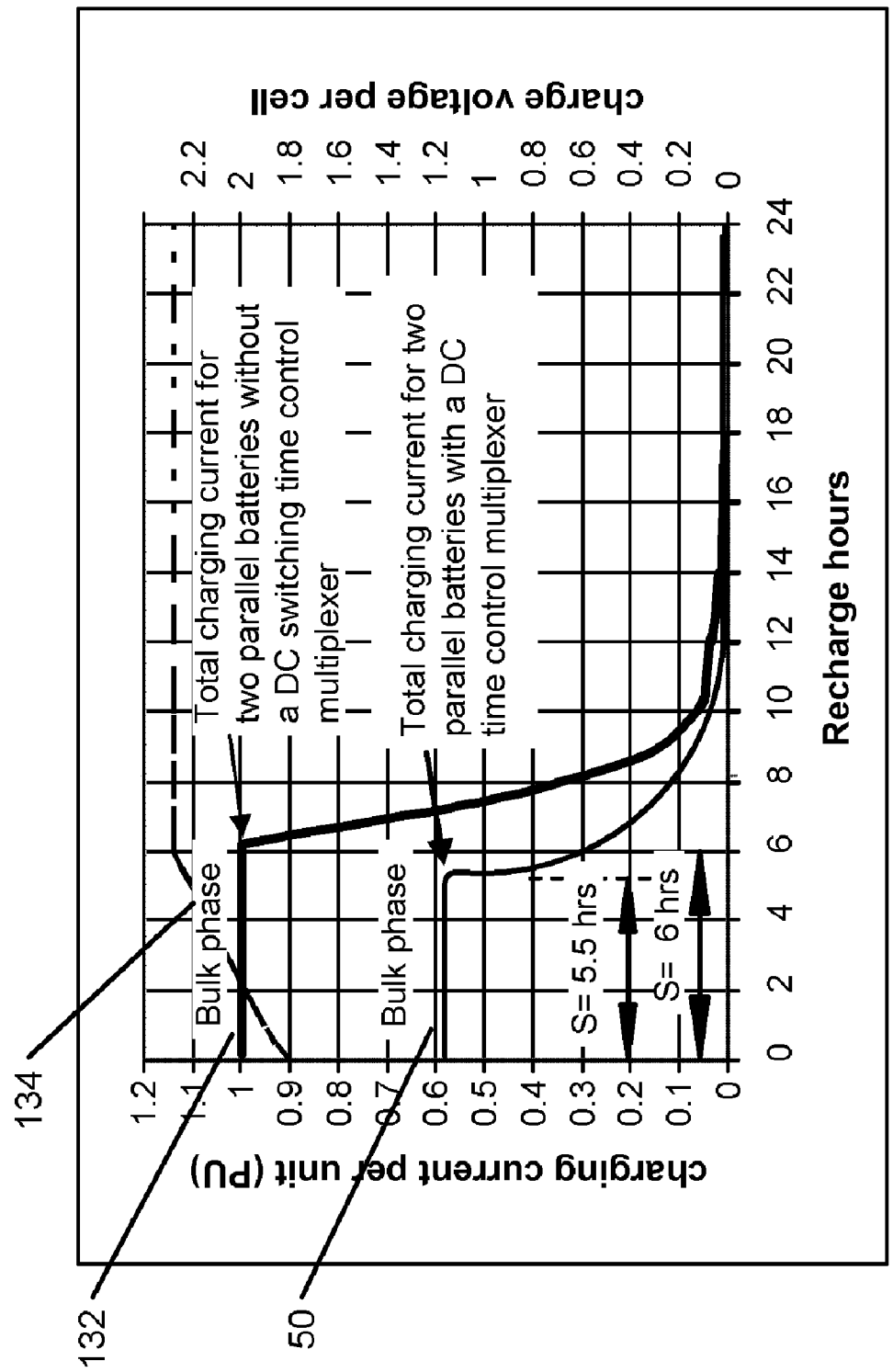
FIG. 2 provides an exemplary plot of the charging current versus time for the system of FIGS. 1A and 1B.

With reference to FIG. 2, an exemplary plot of the charging current 50 and voltage 134 versus time for batteries charging system in accordance with FIGS. 1A and 1B is provided. In addition, FIG. 2 illustrates the total charging current supplied by the power source in FIGS. 1A and 1B is being less than a total charging current required for parallel charging in a prior art system by 30-50%. The charging current 50 is observed to be constant during the bulk phase for a predetermined time S equal to 5.5 hours while the charging voltage 134 increases. After the batteries are near full charge (approximately 85% SOC), the charging current 50 is observed to drop while the voltage 134 becomes constant. FIG. 2 also provides the charging current 132 for a prior art method in which a switching time control multiplexer 24 is not used. The prior art clearly utilizes higher charging current 132 when charging two parallel batteries. The charging current 132 is observed to be constant for a predetermined time S equal to 6 hours while the charging voltage 134 increase and, therefore, a large power source is needed, all other parameters being equal.

Figure 3A:
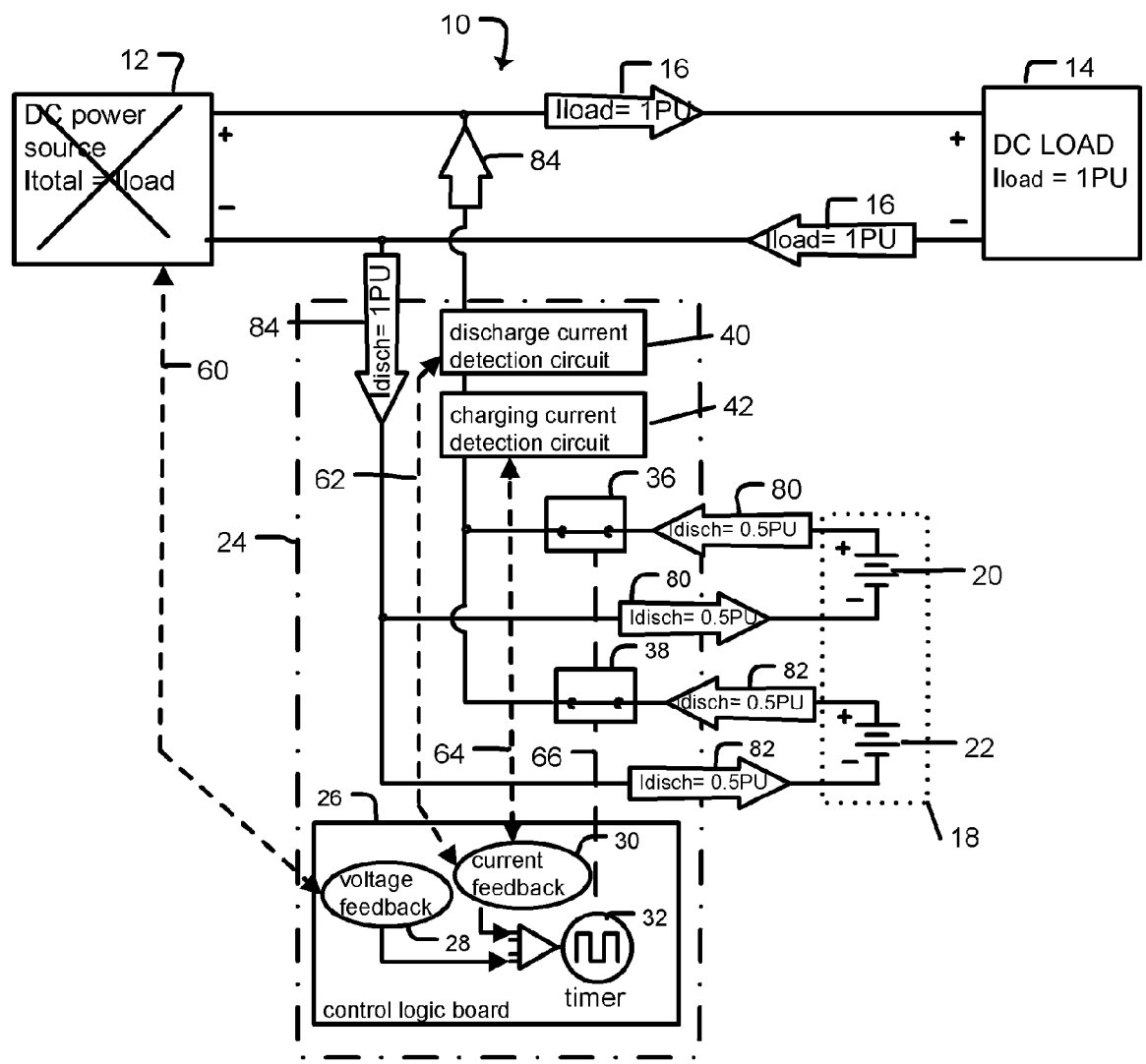
FIG. 3A is a schematic illustration of the system of FIGS. 1A, 1B, and 1C without diodes under conditions where the power source is inoperable or removed.
Figure 3B:
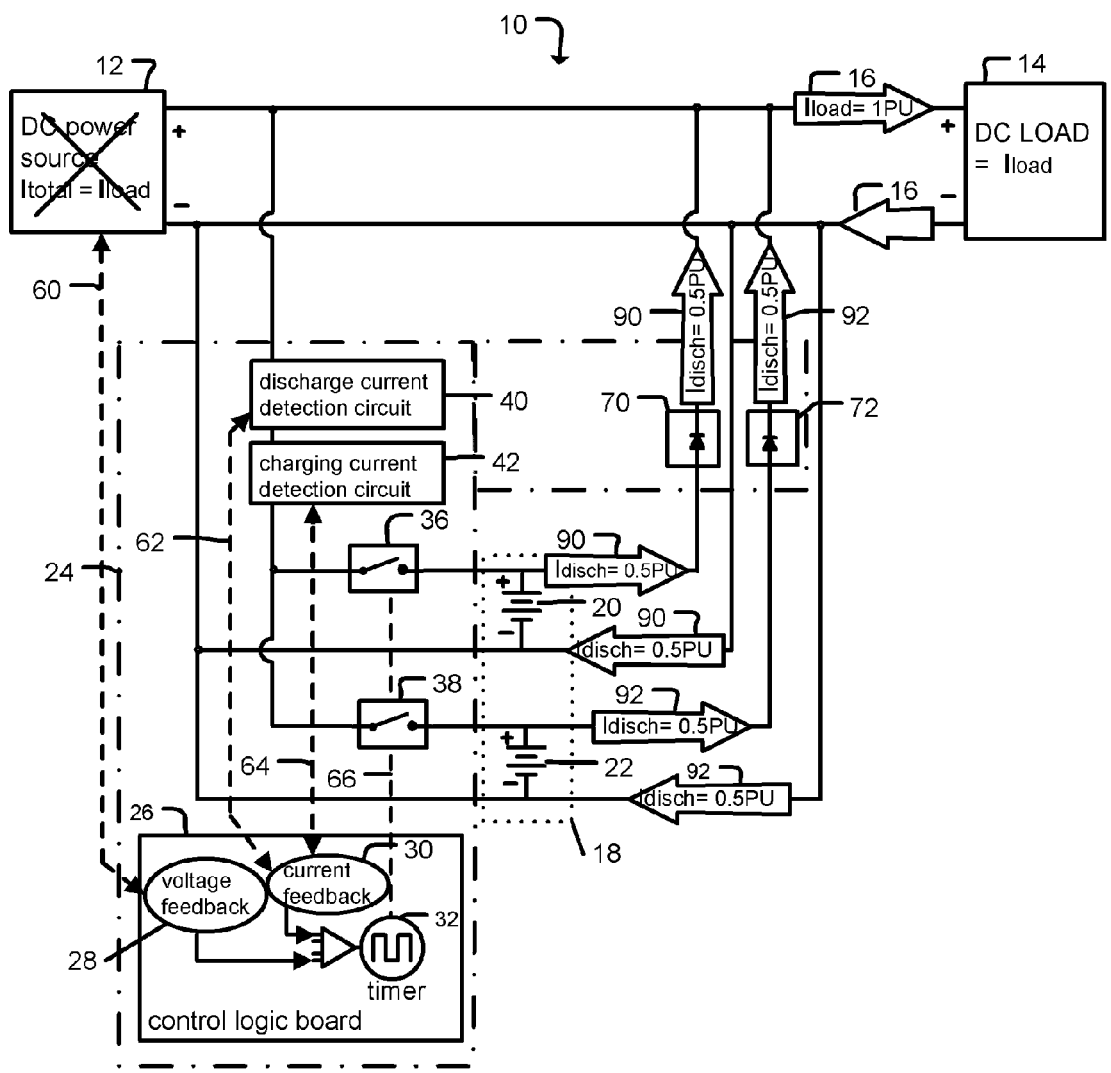
FIG. 3B is a schematic illustration of the system of FIGS. 1A, 1B, and 1C with diodes under conditions where the power source is inoperable or removed.

FIGS. 3A and 3B provide schematic illustrations of the system of FIGS. 1A and 1B under conditions where the power source is inoperable or removed. FIG. 3A depicts the situation in which diodes are not present. In this variation, load current 16 is provided from energy storage devices 20, 22 to DC load 14. In one variation, switches 36 and 38 both close instantly when energy storage devices 20, 22 discharge. Discharging currents 80 and 82 combine to form discharging current 84 that is equal to DC load current 16. In another variation, FIG. 3B depicts the situation in which diodes are present. In this variation, switches 36, and 38 both open instantly when energy storage devices 20, 22 discharge. In this configuration, energy storage device 20 provides discharging current 90 while energy storage device 22 provides discharging current 92 via diodes 70, 72, respectively, to DC load 14. In one variation, discharge currents 90 and 92 are combined to provide total discharge that is equal to the DC load current 16.

Figure 4:
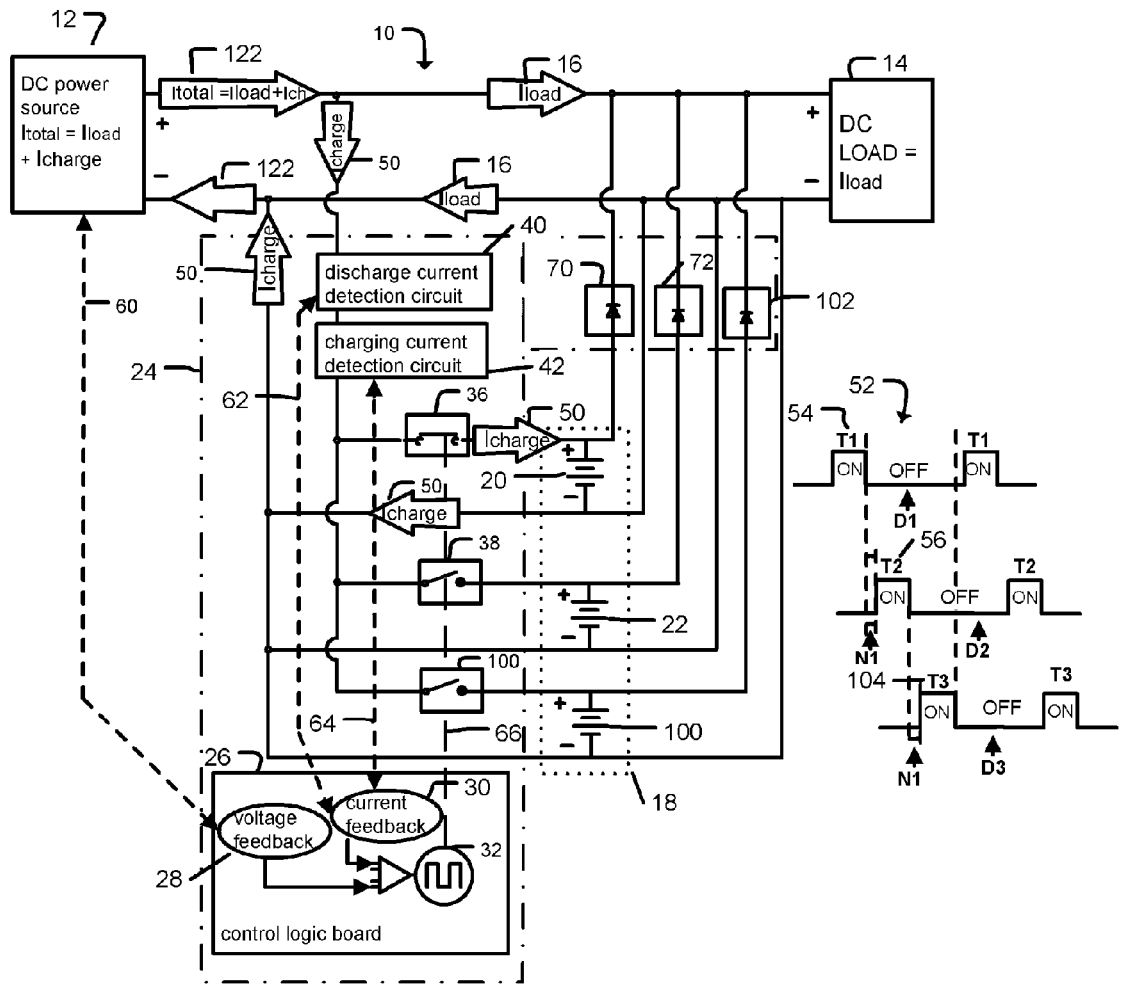
FIG. 4 is a schematic illustration of a system for energizing a storage system having three energy storage devices.

With reference to FIG. 4, a schematic illustration demonstrating the expandability of the system of FIGS. 1A, 1B, and 1C is provided. FIG. 4 is a schematic illustration of a system for energizing a storage system having three energy storage devices. In the energy systems of the invention, energy storage system 18 may include an arbitrary number of energy storage devices so long as the number is two or more. The example depicted in FIG. 4 illustrates an energy storage system including three energy storage devices—devices 20, 22, and 100. It should also be pointed out that the number of energy storage devices may be increased at any time, even after system 10 is deployed.

Figure 5A:
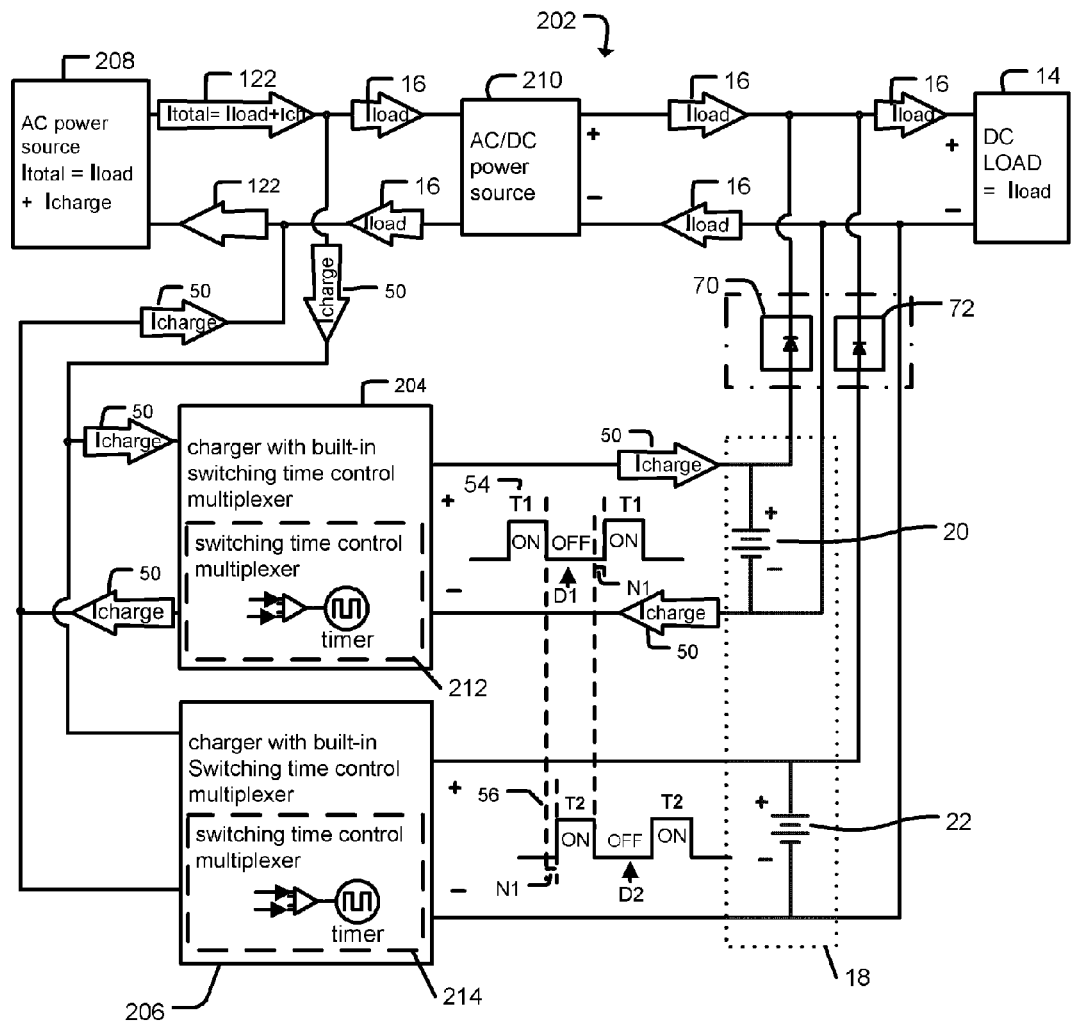
FIG. 5 is a schematic illustration of a system for another method of energizing a storage system having at least two parallel energy storage devices in which each storage device is charged in an alternating manner.
Figure 5B:
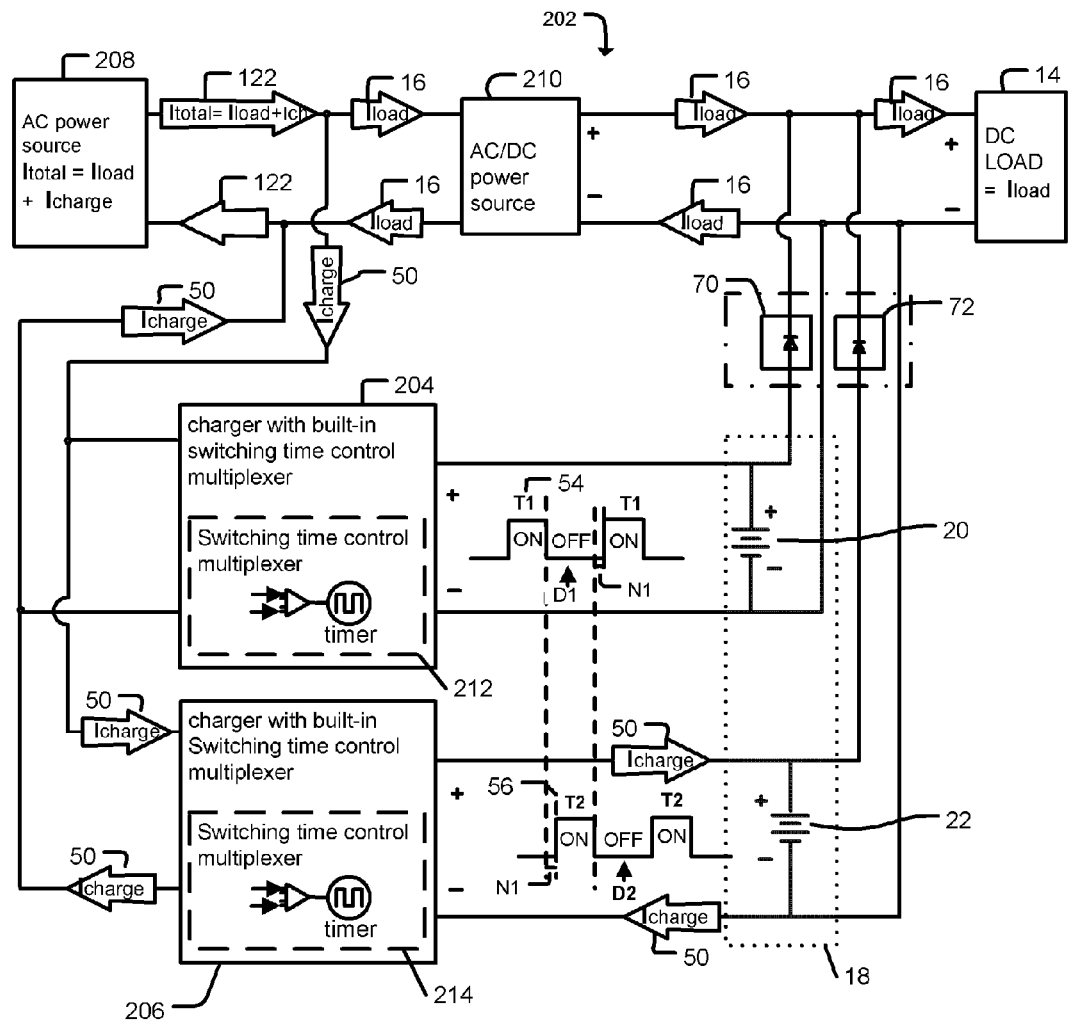

With reference to FIG. 5A and 5B, a schematic illustration of a system for another method for energizing a storage system having at least two parallel energy storage devices 20, 22 in which each storage device is charged in an alternating manner is provided. In the present embodiment, charging system 202 includes power source 210 in communication with DC load 14. The present embodiment may be used with virtually any electric power source including both AC and DC electric power sources. Examples of electric power sources that may be used include, but are not limited to, photovoltaic (PV)/solar cells, AC/DC power supplies, chargers, rectifier charging sources, or wind electric generators. Current 16 represents the load that DC load 14 places on power source 210. System 202 also includes energy storage system 18, which has energy storage devices 20, 22, which are in communication with charging systems 204, 206. Charging systems 204, 206 are in communication with power source 208, which too may be a DC or AC power source. Examples of energy storage devices are the same as those set forth above. Charging systems 204, 206 include built-in switching time control multiplexers 212, 214, respectively.

Each of switching time control multiplexers 212, 214, respectively, have a control logic board which includes one or more of the following: a voltage feedback circuit, current feedback circuit, and time controller as set forth above. Each of switching time control multiplexers 212, 214 may optionally include a discharge current detection circuit and charge current detection circuit as set forth above. In the present embodiment, energy devices 20, 22 are alternately charged with the time sequences shown by insets 54, 56. In the present embodiment, these sequences are established by time delays established by the control logic boards.

One skilled in the art will readily recognize that the system and methods of the present embodiment can be used in a number of applications. For example, the system is used to charge all types of rechargeable (secondary) battery cells including, but not limited to, lead acid (flooded, sealed/VRLA), submarine, nickel-cadmium (Ni—Cd), lithium-ion (Li-Ion), nickel-metal hydride) (Ni-MH), NaS sodium sulfur, etc. These type of rechargeable batteries are used for, but not limited to, energy storage, emergency power, as well as for engine starting, vehicle lighting and engine ignition, and the like. In addition, the systems set forth above may be used to energize a number of different storage devices, examples of which include, but are not limited to, capacitors, super capacitors, flywheels, and superconducting magnetic energy storage (SMES). Various embodiments of the present invention are advantageously used in all types of renewable energy and distributed generation technologies including, but not limited to, photovoltaic (PV)/solar, wind-generation, pumped hydro storage, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for energizing an energy storage device, the system comprising:
   an electric power source;
   an energy storage system in communication with the electric power source, the energy storage system including a first energy storage device and a second energy storage device, the first and second energy storage devices being in parallel; and
   a switching time control multiplexer configured to supply a total charging current from the electric power source to the energy storage system in which each storage device is charged in an alternating manner with a predetermined frequency, the total charging current being less than a total parallel charging current required for parallel charging, the predetermined frequency defining a first time during which the first energy storage device is charged and a second time during which the second storage device is charged.

2. The system of claim 1 wherein the switching time control multiplexer is configured to control the time duration of charging current and voltage to the energy storage device.

3. The system of claim 1 wherein the switching time control multiplexer is configured to supply charging current to the energy storage device that is equal to or greater than an optimized charging current for the energy storage device in a parallel charging system.

4. The system of claim 1 wherein the energy storage system is expandable.

5. The system of claim 1 wherein the energy storage device is a rechargeable battery, capacitor, super capacitor, superconducting magnetic energy storage device, or a flywheel.

6. The system of claim 1 wherein the switching time control multiplexer is configured to include a non-charging state for a predetermined time between charging the energy storage devices.

7. The system of claim 1 wherein the switching time control multiplexer is configured to have associated diodes to independently charge and discharge each energy storage device.

8. The system of claim 1 wherein the switching time control multiplexer is configured to cease supplying charging current and voltage for a predetermined time when the energy storage device reaches a predetermined amount of energy.

9. The system of claim 1 wherein each energy storage device has an associated diode to independently discharge each energy device and to optimize its performance and lifetime.

10. The system of claim 1 wherein the electric power source is a photovoltaic (PV)/solar cell, AC/DC power supply, charger, rectifier charging source, or a wind electric generator.

11. A system for energizing an energy storage device, the system comprising:
    an electric power source;
    an electric energy storage system in communication with the electric power source, the energy storage system including a first battery and a second battery; and a switching time control multiplexer configured to supply total charging current from the electric power source to the electric energy storage system in which each battery is charged in an alternating manner with a predetermined frequency, the total charging current being less than a total charging current required for parallel charging, the predetermined frequency defining a first time during which the first battery is charged and a second time during which the second battery is charged.

12. The system of claim 11 wherein the switching time control multiplexer is configured to supply charging current to the energy storage device that is equal to or greater than an optimized charging current for the battery in a parallel charging system.

13. The system of claim 11 wherein the energy storage system is expandable.

14. The system of claim 11 wherein the switching time control multiplexer is configured to include a non-charging state for a predetermined time between charging the batteries.

15. The system of claim 11 wherein the switching time control multiplexer is configured to independently charge and discharge each battery.

16. The system of claim 11 wherein the switching time control multiplexer is configured to cease supplying charging current and voltage for a predetermined time when the battery reaches a predetermined amount of energy.

17. The system of claim 11 wherein each battery has an associated diode to independently discharge each battery and to optimize its performance and lifetime.

18. The system of claim 11 wherein the electric power source is a photovoltaic/solar cell, AC/DC power supply, a charger, rectifier charging source, or a wind electric generator.

19. The system of claim 11 wherein the switching time control multiplexer is configured to prevent the batteries from deep discharge.

* * * * *